United States Patent
Enenkel et al.

(10) Patent No.: US 7,313,584 B2
(45) Date of Patent: Dec. 25, 2007

(54) INCREASED PRECISION IN THE COMPUTATION OF A RECIPROCAL SQUARE ROOT

(75) Inventors: Robert F. Enenkel, Markham (CA); Robert L. Goldiez, Apex, NC (US); T.J. Christopher Ward, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 10/632,362

(22) Filed: Jul. 31, 2003

(65) Prior Publication Data
US 2005/0027772 A1    Feb. 3, 2005

(51) Int. Cl.
*G06F 7/552*    (2006.01)
(52) U.S. Cl. .................................... 708/605
(58) Field of Classification Search ............... 708/605
See application file for complete search history.

(56) References Cited

U.S. PATENT DOCUMENTS 6,341,300 B1 *  1/2002  Shankar et al. ............ 708/605
6,349,319 B1 *  2/2002  Shankar et al. ............ 708/500
6,963,895 B1 * 11/2005  Comstock .................. 708/502

OTHER PUBLICATIONS

Abramowitz & Stegun, "Handbook of Mathematical Functions", 1964, pp. 14, 15, 18.
"IBM PowerPC 440 FPU Brings Supercomputing Into the Embedded Space", IBM PowerPC Processor News, Aug. 2001. http://www-3.ibm.com/chips/products/powerpc/newsletter/aug2001.
IEEE 754, IEEE Standard for Binary Floating-Point Arithmetic, ANSI/IEEE Std 754-1985, IEEE Standard for Binary Floating-Point Arithmetic, IEEE, New York, 1985.

* cited by examiner

*Primary Examiner*—D. H. Malzahn
(74) *Attorney, Agent, or Firm*—Ference & Associates LLC

(57) ABSTRACT

A method and arrangements for increased precision in the computation of a reciprocal square root is disclosed. In accordance with the present invention, it is possible to achieve fifty three (53) bits of precision in less processing time than previously possible.

3 Claims, 5 Drawing Sheets

INCREASED PRECISION IN THE COMPUTATION OF A RECIPROCAL SQUARE ROOT

FIELD OF THE INVENTION

The present invention relates to increased precision for the computation of a reciprocal square root.

BACKGROUND OF THE INVENTION

In microprocessor design, it is not unusual for the designer of the chip to specify that certain functions are to be performed by the chip. The implementation of the specified functions is then left to another designer. Two such functions which are specified for some microprocessors are the square root function 'sqrt(x)' and the reciprocal square root function '1/sqrt(x)'. One microprocessor family for which these functions have been specified and implemented is the IBM PowerPC. Such a microprocessor is used in the IBM Blue Gene/L Supercomputer ("BG/L"). See [http://www.ibm.com/chips/products.powerpc/newsletter/aug2001/new-prod3.html.

The reciprocal square root function is necessary in a number of calculations used in a variety of applications, however, it generally is used in connection with determining the direction of the vector between any two points in space. By way of example, such a function is used in calculating the direction and magnitude of the force between pairs of atoms when simulating the motion of protein molecules in water solution. The function is also used in calculating the best estimate of the rotation and shift between a pair of images of a triangle, i.e., where the triangle might be defined by 3 points picked out on a digital image, such as an image of a fingerprint; for the purpose of matching a 'candidate' fingerprint in a large set of 'reference' fingerprints.

While the reciprocal square root function may be implemented in a number of ways, there is no standard for its precision. The function should optimally return the double-precision floating point number nearest to the reciprocal of the square root of its argument 'x'. Compare IEEE Standard for Binary Floating-Point Arithmetic (IEEE 754). ANSI/IEEE Std 754-1985, IEEE Standard for Binary Floating-Point Arithmetic, IEEE, New York, 1985. To arrive at such a result, however, requires significant computational resources such as processing time.

In most computational situations, however, it is sufficient to generate an approximation of the reciprocal square root of a number that is precise to some number of bits smaller than the standard fifty three (53) bits. Known implementations of the reciprocal square root function involve a trade-off between precision and computational resources, i.e., processing time.

There thus is a need for a method and system for calculating the reciprocal of a square root of a number that provides for both greater accuracy and greater precision without increasing the need for computing time and resources.

SUMMARY OF THE INVENTION

In accordance with at least one presently preferred embodiment of the present invention there is now broadly contemplated increased precision in the computation of the reciprocal square root of a number One aspect of the present invention provides a method of for calculating the reciprocal square root of a number, comprising the steps of: forming a piecewise-linear estimate for the reciprocal square root of a number; rounding said estimate to a lower precision; computing the residual of said rounded estimate; using a Taylor Expansion to compute the polynomial in said residual of said estimate to obtain the residual error; and multiplying said rounded estimate by said residual error and adding the result to said rounded estimate.

Another aspect of the present invention provides an apparatus for calculating the reciprocal square root of a number, comprising: an arrangement for forming a piecewise-linear estimate for the reciprocal square root of a number; an arrangement for rounding said estimate to a lower precision; an arrangement for computing the residual of said rounded estimate; an arrangement for using a Taylor Expansion to compute the polynomial in said residual of said estimate to obtain the residual error; and an arrangement for multiplying said rounded estimate by said residual error and adding the result to said rounded estimate.

Furthermore, an additional aspect of the present invention provides A program storage device readable by machine, tangibly embodying a program of instructions executable by the machine to perform a method for calculating the reciprocal square root of a number, comprising the steps of: forming a piecewise-linear estimate for the reciprocal square root of a number; rounding said estimate to a lower precision; computing the residual of said rounded estimate; using a Taylor Expansion to compute the polynomial in said residual of said estimate to obtain the residual error; and multiplying said rounded estimate by said residual error and adding the result to said rounded estimate.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
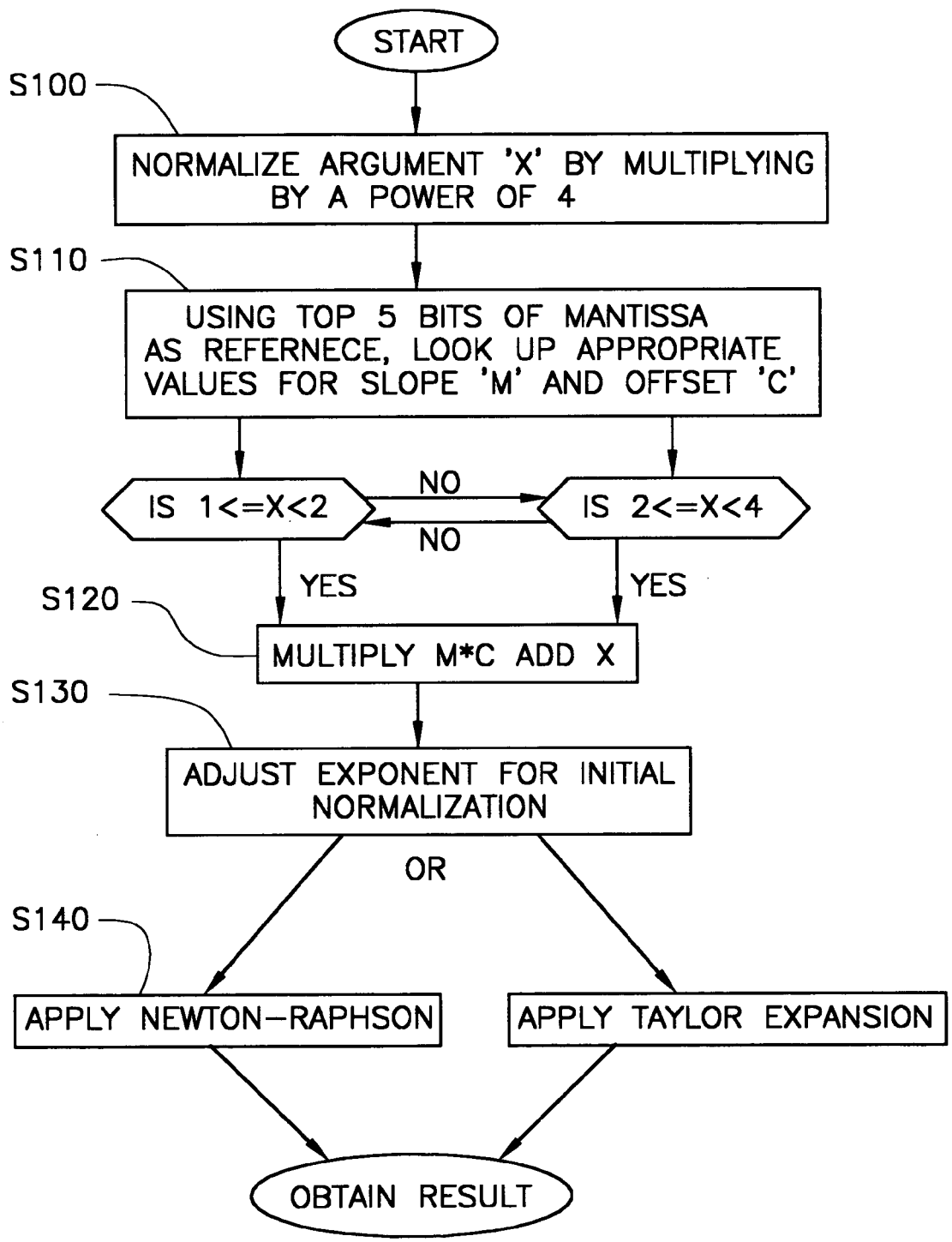
FIG. 1 is a flow diagram of the PowerPC implementation of the process for determining the reciprocal square root of the argument 'X'.

As previously discussed, IBM PowerPC processors all contain a 'reciprocal square root estimate '. Referring now to FIG. 1, a piecewise-linear estimate for the reciprocal square root is formed initially. In this implementation of the function, at S100, the argument is first normalized (multiplied by a power of 4) into a range of $1<=x<4$. Next, at S110, the top five bits (after the implied leading '1') of the mantissa are used to index one of two pairs of 32-element tables, depending on whether x is in the range '$1<=x<2$' or in the range '2<=x<4'. This results in slope and offset values 'm' and 'c', respectively, appropriate for range 'x'. At S120, The value 'm*x+c' is calculated and, at S130, the exponent is adjusted for the initial normalization. At S140, to get from this estimate to the desired result one of two well-known conventional methods is generally used—the Newton-Raphson Iteration or the Taylor Series Expansion.

Figure 2:
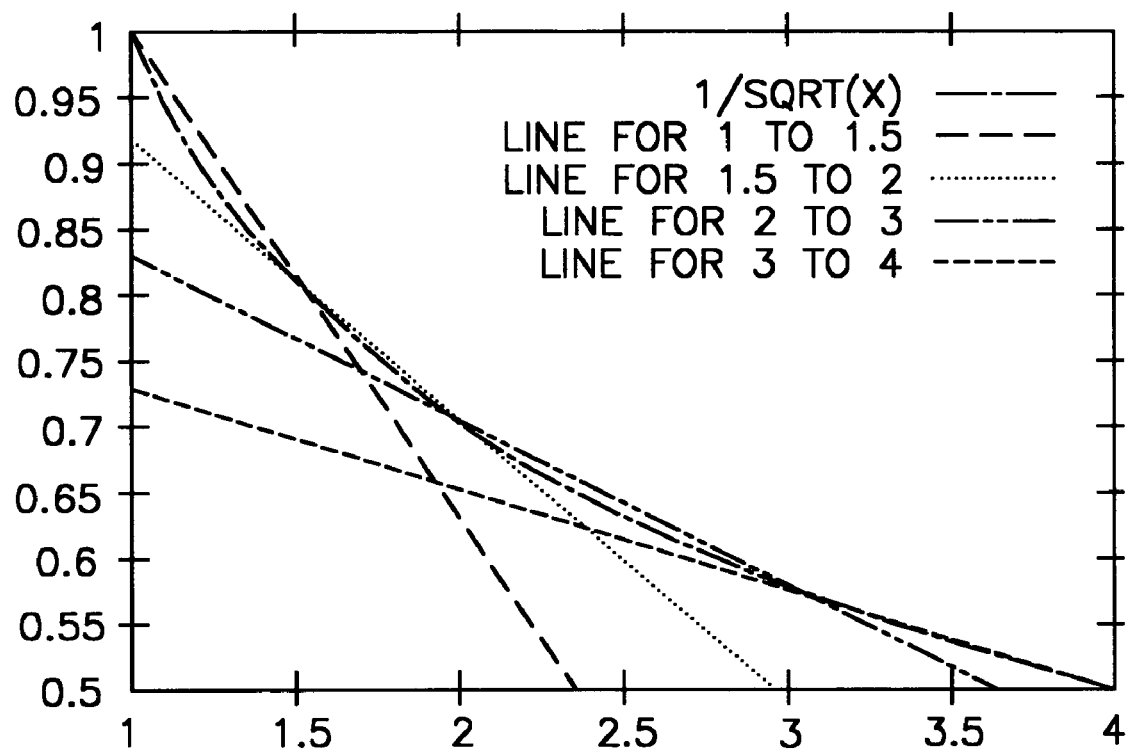
FIG. 2 is a graph diagram of the values returned for the piecewise-linear estimate for the reciprocal square root of a number in the range of 1 to 2 and 2 to 4.

The process of forming a piecewise-linear estimate is described in S100-S130, is discussed below, and is well known in the art. See Abromowitz and Stegun, *Handbook of Mathematical Functions*, (1964). FIG. 2 illustrates the graph diagram for the piecewise-linear estimate for the reciprocal square root of a number in the range of 1 to 2 and 2 to 4. As can be seen, the process of forming the estimate involves splitting the region from 1 to 2 into 2(two) sections and the region from 2 to 4 into 2 (two) sections. The process of rounding causes the graph lines to become staircase progressions instead of the straight lines depicted in FIG. 2. As discussed above, once the piecewise-linear estimate is formed, the estimate is usually adjusted by applying Newton's Method or performing a Taylor Expansion.

The Newton-Raphson iteration (also called "Newton's Method") is well known and is discussed in detail in Abromowitz and Stegun, *Handbook of Mathematical Functions*, (1964), p.18, which is hereby incorporated by reference. Newton's Method recognizes that the reciprocal square root of 'a' is the solution of the formula a*x*x−1=0. The solution is derived through a few iterations of the formula. The Taylor Series is also well known and is also described in particularity in Abromowitz (p.15), which is also hereby incorporated by reference. In the Taylor Series, the estimate 'x0' of the reciprocal square root is adjusted for more accuracy using an error term 'e' as follows. The equation a*x0*x0-1 is solved and a correction term 'epr' is developed solving the equation 'epr=(1+e)**(−0.5)−1'. In the result, 'x0+(x0*epr), 'e' will be small (less than 2**−13 in the BG/L implementation), so the first four (4) or so terms of the asymptotic polynomial expansion for 'epr' will be sufficient to achieve the desired precision.

The PowerPC processor defines a 'floating point multiply-add' instruction, which computes 'a*b+c' for 53-bit-precise arguments and returns a 53-bit-precise result. Using the 'floating-point multiply-add instruction' present in the IBM PowerPC and similar processors, the intermediate arithmetic calculation of 'a*b' is carried to 106 bits of precision. This gives extended precision for cases where 'a*b' and 'c' are nearly equal in magnitude but of opposite sign. In the case of the 'square root' function and the 'reciprocal function', this instruction can provide good accuracy in approximating the solutions for the equations 'x*x−a=0' and 'a*x−1=0'. The merged multiply-add with a result near-0 is apparent from the formulation, and is exploited to bring the results to full 53-bit precision.

In determining the 'reciprocal square root' of a number, the Newton-Raphson method uses two multiplications and an addition. PowerPC rounds the result of this first multiplication to 53 bits of precision, which upsets the precision of the final result. As a consequence, in approximately 30% of the cases, successive Newton-Raphson iterations fail to converge upon the correct result, instead oscillating between a number greater than the correct result and lower then the correct result. Further, when using the Taylor Expansion, this rounding off to 53 bits of precision results in an error term 'e' that is insufficient to correct the approximation error, thus in 20% of the cases, the Taylor Expansion fails to provide a desired result.

Figure 3:
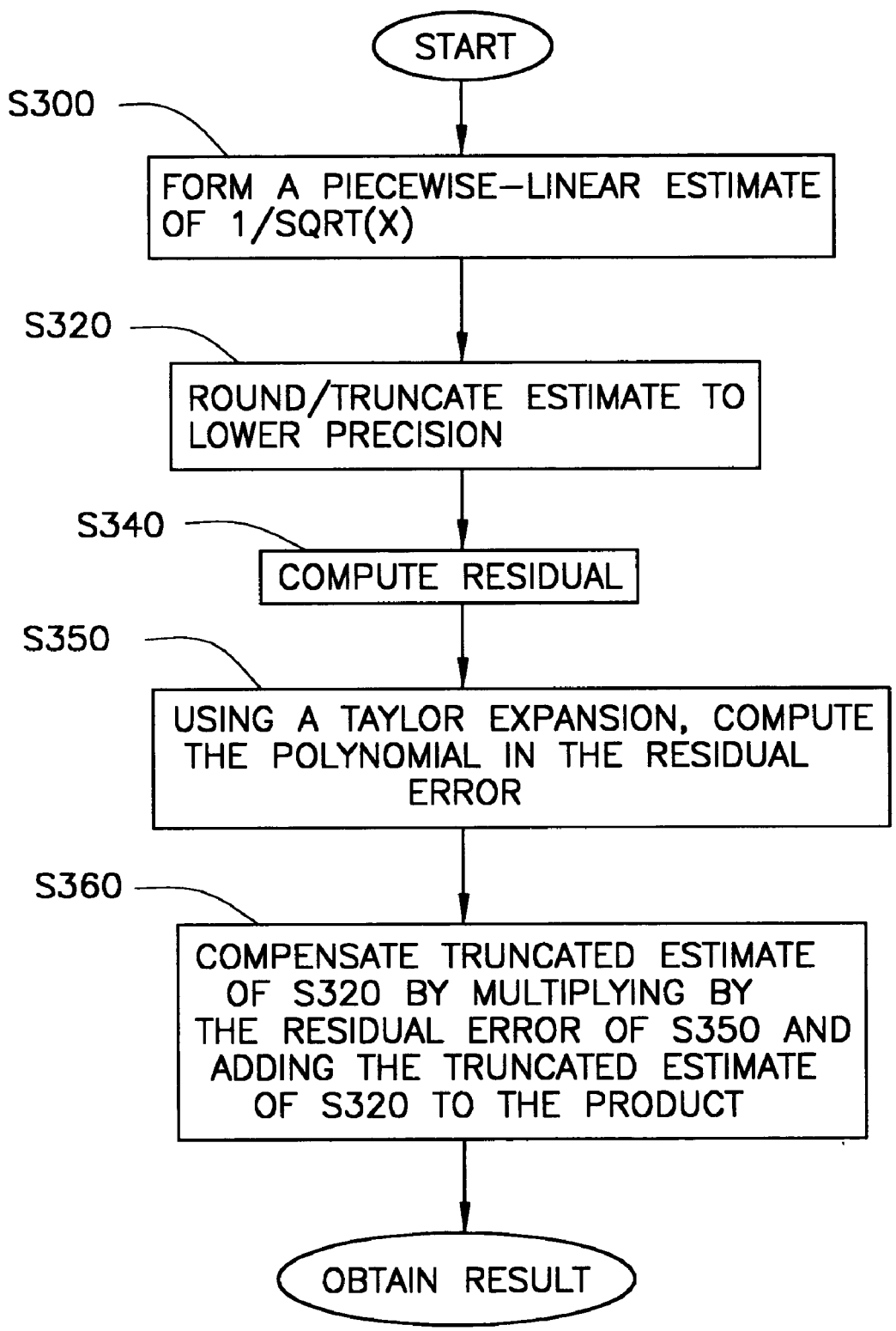
FIG. 3 is a flow diagram of a process involving the determination of the reciprocal square root in conformity with the present invention.

Referring now to FIG. 3, the process for calculating the reciprocal square root of a number in accordance with the present invention is depicted. As was earlier described in S100 through S130 of FIG. 1, and as further illustrated in FIG. 2, the process depicted in FIG. 3 begins by forming a piecewise-linear estimate. At S300, a piecewise-linear estimate for the reciprocal of the square root of 'x' is formed by multiplying x by a power 4 into a range of 1<=x<4. The top 5 bits of the mantissa are used to index one of two pairs of 32-element tables where the pairs are slope 'm' and offset 'c'. It will be appreciated that more or less than the top 5 bits of the mantissa may be used depending on the microprocessor's precision. The values for 'm' and 'c' are looked up in the appropriate table depending on whether 1<=x<2 or 2<=x<4. Next, in S320, the estimate is rounded/truncated to one half of the microprocessor's precision or less than one half. It will be appreciated that in one preferred embodiment of the invention the rounding/truncating of step S320 may be performed to a least one half of the microprocessor's precision, but, in many cases may be performed to less than one half. In S340, the residual is computed by so that the rounded/truncated estimate is multiplied by itself and the result is then multiplied by the argument 'x' and 1.0 is subtracted from the product to obtain the residual error. In S350, the polynomial in the residual error is computed by using a Taylor Expansion where the argument value is the residual error calculated in S340. In S360 the original rounded estimate of S320 is compensated by adding the extended precision intermediate product (residual error) of S350 to the original estimate of S320. In 99.9994% of the time, the result is the IEEE-representable (53-bit) number nearest the infinite precision value for the reciprocal square root of 'x'. In the other 0.0006% of the time, the result is the IEEE-representable (53-bit) number nearest the infinite precision value for the reciprocal square root of 'x' but incorrectly rounded in the least significant bit.

Figure 4:
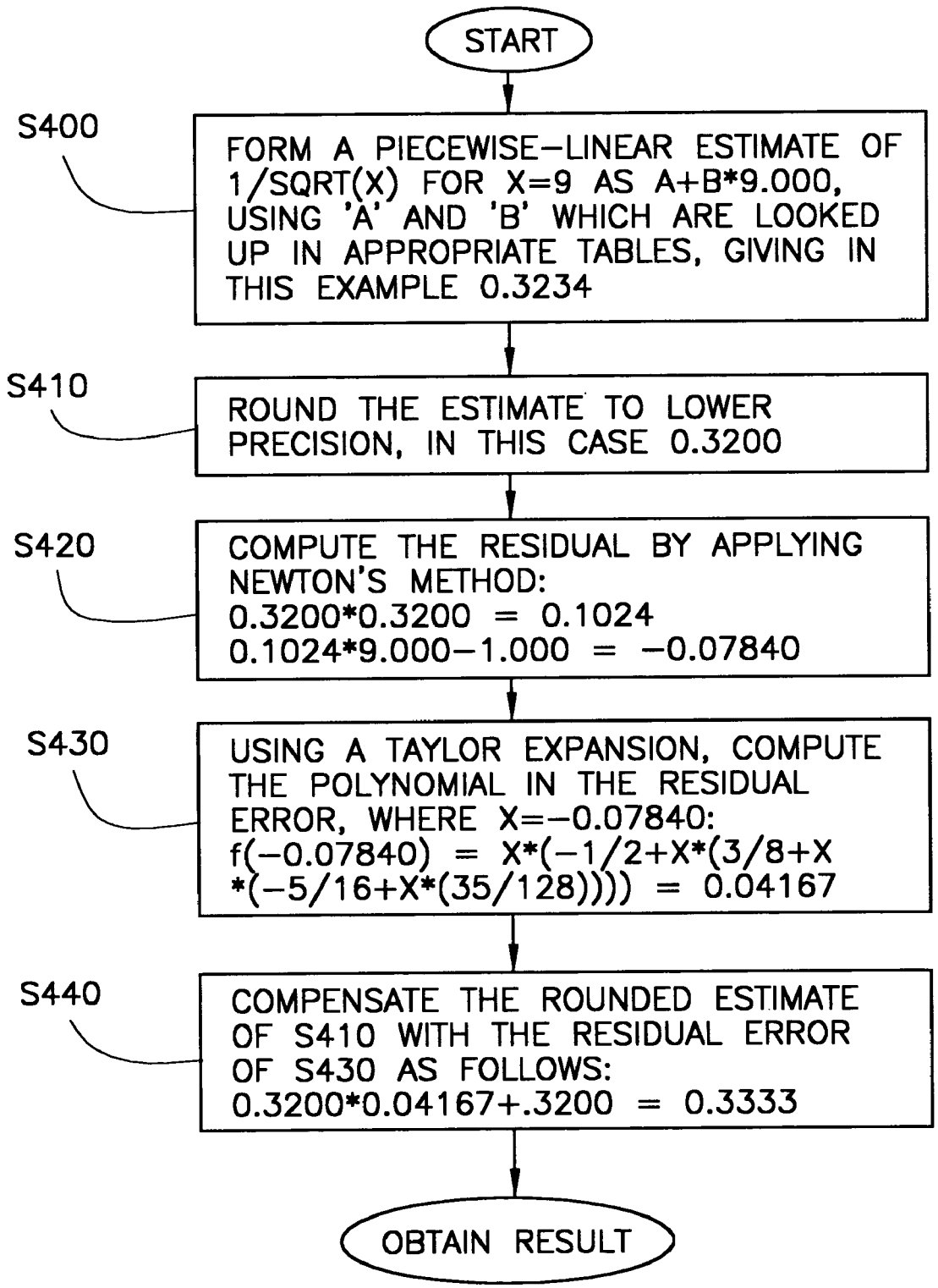
FIG. 4 is a more particular flow diagram of a process involving the determination of the reciprocal square root of 9 in conformity with the present invention.

Moving on to FIG. 4, the process for estimating the reciprocal square root of 9 is depicted in accordance with the present invention, assuming a base-10 number system. It should be appreciated that the invention is applicable to any number of bases including binary and hexadecimal numbers. First, at S400, a piecewise-linear estimate for the reciprocal square root of 9 is obtained by finding the values for A and B using the equation A+B*9. In the example, the value is 0.3234. Next, at S410, this value is then rounded to two decimal places to obtain a new estimate of 0.32. At S420, the calculation is as follows: 0.3200×0.3200=0.1024, 0.1024×9.000−1.000=−0.07840. At S430, a Taylor Expansion is performed and the polynomial in the residual of −0.07840 is calculated to the desired number of terms as follows, using the polynomial equation f(x)=x*(−½+x*(−5/16+x*35/128))) where x=−0.07840, f (−0.07840)=0.04167. At S440, the result of the Taylor Expansion is used to compensate the original rounded piecewise-linear estimation as follows: 0.3200*0.04167+0.3200=0.3333.

As can be seen from the above discussion, it is apparent that by rounding off the estimate to half the processor's floating point precision or less than half that precision, the 'multiply' operation used to square the rounded estimate is exact in that all the bits that would nominally be dropped when the machine rounds the result are zeroes. This results in a more accurate error factor 'e' and provides a more accurate end result.

Thus, in 99.9994% of test cases, the present invention results in a desired result. In the remaining 0.0006%, there is a rounding error in the last significant bit. It will be appreciated that the invention results in a significant improvement over the 70% accuracy provided by the Newton-Raphson Method and the 80% accuracy of the Taylor Expansion without rounding.

Figure 5:
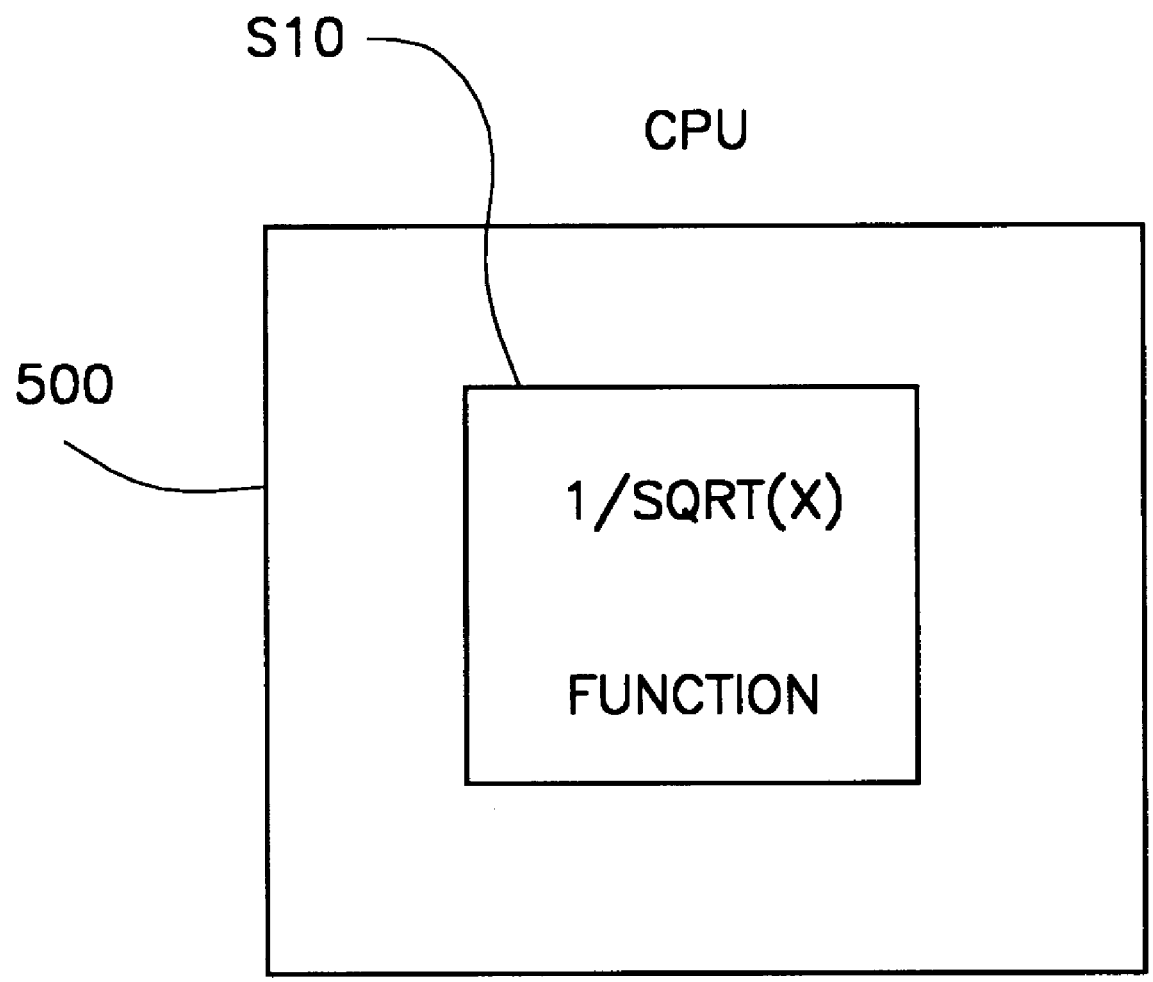
FIG. 5 depicts a microprocessor suitable for implementing the process of determining the reciprocal square root in conformity with the present invention.

Finally, FIG. 5 depicts a microprocessor suitable for implementing the process of determining the reciprocal square root in conformity with the present invention. At 500, the microprocessor is depicted. At 510, the processor function for calculating the reciprocal square root of a number in conformity with the present invention is depicted. In one preferred embodiment of the invention, the microprocessor will be capable of performing calculations with up to 106 bits of precision. However, it will be appreciated that the invention herein is applicable to microprocessors having more or less than the 106 bits of precision assumed herein.

Set forth in the Appendix hereto is a compiler listing, which includes source code written in the C computer language that a programmer would use to instruct a microprocessor or computer to evaluate the reciprocal square root of a number, a timing section timing section which shows how many clock cycles the compiler estimate the program will take, and the sequence of machine instructions to implement the code. The material in the Appendix illustrates how the present invention may be utilized.

It is to be understood that the present invention, in accordance with at least one preferred embodiment, includes an arrangement for forming a piecewise-linear estimate for the reciprocal square root of a number; an arrangement for rounding said estimate to a lower precision; an arrangement for computing the residual of said rounded estimate; an arrangement for using a Taylor Expansion to compute the polynomial in said residual of said estimate to obtain the residual error; and an arrangement for multiplying said rounded estimate by said residual error and adding the result to said rounded estimate. Together these elements may be implemented on at least one general-purpose computer running suitable software programs. These may be implemented on at least one Integrated Circuit or part of at least one Integrated Circuit. Thus, it is to be understood that the invention may be implemented on hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

APPENDIX

VisualAge C++ for Linux on pSeries, Version 6.0.0.0 --- tenrootc.c
07/30/2003 11:41:05 AM (C)
>>>>> SOURCE SECTION <<<<<

```
 1 | #include <math.h>
 2 | double reciprocal_square_root(double x)
 3 | {
 4 |     return 1.0/sqrt(x) ;
 5 | }
 6 |
 7 | void ten_reciprocal_square_root(double* f, const double* x)
 8 | {
 9 |     double x0 = x[0] ;
10 |     double x1 = x[1] ;
11 |     double x2 = x[2] ;
12 |     double x3 = x[3] ;
13 |     double x4 = x[4] ;
14 |     double x5 = x[5] ;
15 |     double x6 = x[6] ;
16 |     double x7 = x[7] ;
17 |     double x8 = x[8] ;
18 |     double x9 = x[9] ;
19 |     double r0 = 1.0/sqrt(x0) ;
20 |     double r1 = 1.0/sqrt(x1) ;
21 |     double r2 = 1.0/sqrt(x2) ;
22 |     double r3 = 1.0/sqrt(x3) ;
23 |     double r4 = 1.0/sqrt(x4) ;
24 |     double r5 = 1.0/sqrt(x5) ;
25 |     double r6 = 1.0/sqrt(x6) ;
26 |     double r7 = 1.0/sqrt(x7) ;
27 |     double r8 = 1.0/sqrt(x8) ;
28 |     double r9 = 1.0/sqrt(x9) ;
29 |     f[0] = r0 ;
30 |     f[1] = r1 ;
31 |     f[2] = r2 ;
32 |     f[3] = r3 ;
33 |     f[4] = r4 ;
34 |     f[5] = r5 ;
35 |     f[6] = r6 ;
36 |     f[7] = r7 ;
37 |     f[8] = r8 ;
38 |     f[9] = r9 ;
39 | }
40 |
41 |
```

APPENDIX-continued

```
** Procedure List for Proc # 1: ten_reciprocal_square_root End of Phase 3 **
                0: HDR
                4: BB_BEGIN 2 / 0
                0: PROC       f,x,gr3,gr4
                0: DIRCTIV    issue_cycle,0
                0: LR         gr12=gr1
                0: LI         gr0=-16
                0: DIRCTIV    issue_cycle,1
                0: ST4U       gr1,#stack(gr1,-80)=gr1
                0: DIRCTIV    issue_cycle,2
                0: SFPLU      gr12,#stack(gr12,gr0,0)=fp31,fp63
                0: DIRCTIV    issue_cycle,3
                0: SFPLU      gr12,#stack(gr12,gr0,0)=fp30,fp62
                0: DIRCTIV    issue_cycle,4
                0: SFPLU      gr12,#stack(gr12,gr0,0)=fp29,fp61
                0: DIRCTIV    issue_cycle,5
                0: SFPLU      gr12,#stack(gr12,gr0,0)=fp28,fp60
                0: FENCE
                0: DIRCTIV    end_prologue
                0: FENCE
                0: DIRCTIV    issue_cycle,0
               39: DIRCTIV    start_epilogue
               18: LI         gr6=72
               17: LFL        fp13=(*)Cdouble(gr4,64)
                0: DIRCTIV    issue_cycle,1
               16: LI         gr7=56
               18: LFL        fp45=(*)Cdouble(gr4,gr6,0,trap=72)
                0: DIRCTIV    issue_cycle,2
               14: LI         gr5=40
               15: LFL        fp3=(*)Cdouble(gr4,48)
                0: DIRCTIV    issue_cycle,3
               16: LFL        fp35=(*)Cdouble(gr4,gr7,0,trap=56)
               12: LI         gr6=24
                0: DIRCTIV    issue_cycle,4
               19: LA         gr8=.+CONSTANT_AREA%HI(gr2,0)
               13: LFL        fp1=(*)Cdouble(gr4,32)
                0: DIRCTIV    issue_cycle,5
               14: LFL        fp33=(*)Cdouble(gr4,gr5,0,trap=40)
               27: FPRSQRE    fp12,fp44=fp13,fp45
                0: DIRCTIV    issue_cycle,6
               11: LFL        fp31=(*)Cdouble(gr4,16)
               10: LI         gr7=8
                0: DIRCTIV    issue_cycle,7
               25: FPRSQRE    fp11,fp43=fp3,fp35
               12: LFL        fp63=(*)Cdouble(gr4,gr6,0,trap=24)
                0: DIRCTIV    issue_cycle,8
               19: LA         gr9=+CONSTANT_AREA%LO(gr8,0)
                9: LFL        fp10=(*)Cdouble(gr4,0)
                0: DIRCTIV    issue_cycle,9
               23: FPRSQRE    fp9,fp41=fp1,fp33
               10: LFL        fp42=(*)Cdouble(gr4,gr7,0,trap=8)
                0: DIRCTIV    issue_cycle,10
               27: FPMUL      fp4,fp36=fp12,fp44,fp12,fp44,fcr
               19: LFPS       fp8,fp40=+CONSTANT_AREA(gr9,gr6,0,trap=24)
                0: DIRCTIV    issue_cycle,11
               19: LI         gr8=32
               21: FPRSQRE    fp7,fp39=fp31,fp63
                0: DIRCTIV    issue_cycle,12
               25: FPMUL      fp2,fp34=fp11,fp43,fp11,fp43,fcr
               19: LFS        fp30=+CONSTANT_AREA(gr9,4)
                0: DIRCTIV    issue_cycle,13
               19: FPRSQRE    fp6,fp38=fp10,fp42
               19: LFPS       fp29,fp61=+CONSTANT_AREA(gr9,gr8,0,trap=32)
                0: DIRCTIV    issue_cycle,14
               23: FPMUL      fp0,fp32=fp9,fp41,fp9,fp41,fcr
               19: LFPS       fp28,fp60=+CONSTANT_AREA(gr9,gr5,0,trap=40)
                0: DIRCTIV    issue_cycle,15
               19: LI         gr4=48
               27: FPMADD     fp4,fp36=fp8,fp40,fp13,fp45,fp4,fp36,fcr
                0: DIRCTIV    issue_cycle,16
               19: LFPS       fp5,fp37=+CONSTANT_AREA(gr9,gr4,0,trap=48)
               21: FPMUL      fp13,fp45=fp7,fp39,fp7,fp39,fcr
                0: DIRCTIV    issue_cycle,17
               25: FPMADD     fp3,fp35=fp8,fp40,fp3,fp35,fp2,fp34,fcr
               38: LI         gr6=72
                0: DIRCTIV    issue_cycle,18
               19: FPMUL      fp2,fp34=fp6,fp38,fp6,fp38,fcr
               39: LI         gr0=16
                0: DIRCTIV    issue_cycle,19
```

APPENDIX-continued

```
23: FPMADD    fp1,fp33=fp8,fp40,fp1,fp33,fp0,fp32,fcr
39: LR        gr12=gr1
 0: DIRCTIV   issue_cycle,20
27: FXPMADD   fp0,fp32=fp29,fp61,fp4,fp36,fp30,fp30,fcr
36: LI        gr7=56
 0: DIRCTIV   issue_cycle,21
21: FPMADD    fp31,fp63=fp8,fp40,fp31,fp63,fp13,fp45,fcr
 0: DIRCTIV   issue_cycle,22
25: FXPMADD   fp13,fp45=fp29,fp61,fp3,fp35,fp30,fp30,fcr
 0: DIRCTIV   issue_cycle,23
19: FPMADD    fp8,fp40=fp8,fp40,fp10,fp42,fp2,fp34,fcr
 0: DIRCTIV   issue_cycle,24
23: FXPMADD   fp2,fp34=fp29,fp61,fp1,fp33,fp30,fp30,fcr
 0: DIRCTIV   issue_cycle,25
27: FPMADD    fp10,fp42=fp28,fp60,fp4,fp36,fp0,fp32,fcr
 0: DIRCTIV   issue_cycle,26
21: FXPMADD   fp0,fp32=fp29,fp61,fp31,fp63,fp30,fp30,fcr
 0: DIRCTIV   issue_cycle,27
25: FPMADD    fp13,fp45=fp28,fp60,fp3,fp35,fp13,fp45,fcr
 0: DIRCTIV   issue_cycle,28
19: FXPMADD   fp30,fp62=fp29,fp61,fp8,fp40,fp30,fp30,fcr
 0: DIRCTIV   issue_cycle,29
23: FPMADD    fp2,fp34=fp28,fp60,fp1,fp33,fp2,fp34,fcr
 0: DIRCTIV   issue_cycle,30
27: FPMADD    fp10,fp42=fp5,fp37,fp4,fp36,fp10,fp42,fcr
 0: DIRCTIV   issue_cycle,31
21: FPMADD    fp0,fp32=fp28,fp60,fp31,fp63,fp0,fp32,fcr
 0: DIRCTIV   issue_cycle,32
25: FPMADD    fp13,fp45=fp5,fp37,fp3,fp35,fp13,fp45,fcr
 0: DIRCTIV   issue_cycle,33
19: FPMADD    fp30,fp62=fp28,fp60,fp8,fp40,fp30,fp62,fcr
 0: DIRCTIV   issue_cycle,34
23: FPMADD    fp2,fp34=fp5,fp37,fp1,fp33,fp2,fp34,fcr
 0: DIRCTIV   issue_cycle,35
27: FPMUL     fp4,fp36=fp4,fp36,fp10,fp42,fcr
39: LFPLU     fp28,fp60,gr12=#stack(gr12,gr0,0)
 0: DIRCTIV   issue_cycle,36
21: FPMADD    fp0,fp32=fp5,fp37,fp31,fp63,fp0,fp32,fcr
39: LFPLU     fp29,fp61,gr12=#stack(gr12,gr0,0)
 0: DIRCTIV   issue_cycle,37
25: FPMUL     fp3,fp35=fp3,fp35,fp13,fp45,fcr
 0: DIRCTIV   issue_cycle,38
19: FPMADD    fp5,fp37=fp5,fp37,fp8,fp40,fp30,fp62,fcr
 0: DIRCTIV   issue_cycle,39
23: FPMUL     fp1,fp33=fp1,fp33,fp2,fp34,fcr
 0: DIRCTTV   issue_cycle,40
27: FPMADD    fp2,fp34=fp12,fp44,fp12,fp44,fp4,fp36,fcr
39: LFPLU     fp30,fp62,gr12=#stack(gr12,gr0,0)
 0: DIRCTIV   issue_cycle,41
21: FPMUL     fp0,fp32=fp31,fp63,fp0,fp32,fcr
 0: DIRCTIV   issue_cycle,42
25: FPMADD    fp3,fp35=fp11,fp43,fp11,fp43,fp3,fp35,fcr
 0: DIRCTIV   issue_cycle,43
19: FPMUL     fp4,fp36=fp8,fp40,fp5,fp37,fcr
39: LFPLU     fp31,fp63,gr12=#stack(gr12,gr0,0)
 0: DIRCTIV   issue_cycle,44
23: FPMADD    fp1,fp33=fp9,fp41,fp9,fp41,fp1,fp33,fcr
39: AI        gr1=gr1,80,gr12
 0: DIRCTIV   issue_cycle,45
39: CONSUME   gr1,gr2,1r,gr14-gr31,fp14-fp31,fp46-fp63,
              cr[234],fsr,fcr,ctr
38: STFL      (*)double(gr3,gr6,0,trap=72)=fp34
32: LI        gr6=24
 0: DIRCTIV   issue_cycle,46
21: FPMADD    fp0,fp32=fp7,fp39,fp7,fp39,fp0,fp32,fcr
37: STFL      (*)double(gr3,64)=fp2
 0: DIRCTIV   issue_cycle,47
36: STFL      (*)double(gr3,gr7,0,trap=56)=fp35
30: LI        gr7=8
 0: DIRCTIV   issue_cycle,48
35: STFL      (*)double(gr3,48)=fp3
 0: DIRCTIV   issue_cycle,49
19: FPMADD    fp2,fp34=fp6,fp38,fp6,fp38,fp4,fp36,fcr
34: STFL      (*)double(gr3,gr5,0,trap=40)=fp33
 0: DIRCTIV   issue_cycle,50
33: STFL      (*)double(gr3,32)=fp1
 0: DIRCTIV   issue_cycle,51
32: STFL      (*)double(gr3,gr6,0,trap=24)=fp32
 0: DIRCTIV   issue_cycle,52
```

APPENDIX-continued

```
                          31: STFL      (*)double(gr3,16)=fp0
                           0: DIRCTIV   issue_cycle,54
                          30: STFL      (*)double(gr3,gr7,0,trap=8)=fp34
                           0: DIRCTIV   issue_cycle,55
                          29: STFL      (*)double(gr3,0)=fp2
                          39: BA        lr
                           4: BB_END
                           5: BB_BEGIN  3 / 0
                          39: PEND
                           5: BB_END
** End of Procedure List for Proc # 1: ten_reciprocal_square_root End of Phase 3 **
** Procedure List for Proc # 2: reciprocal_square_root End of Phase 3 **
                           0: HDR
                           4: BB_BEGIN  2 / 0
                           0: PROC      x,fp1
                           0: FENCE
                           0: DIRCTIV   end_prologue
                           0: FENCE
                           0: DIRCTIV   issue_cycle,0
                           5: DIRCTIV   start_epilogue
                           4: FRSQRE    fp0=fp1
                           4: LA        gr3=.+CONSTANT_AREA%HI(gr2,0)
                           0: DIRCTIV   issue_cycle,1
                           4: LA        gr3=+CONSTANT_AREA%LO(gr3,0)
                           0: DIRCTIV   issue_cycle,2
                           4: LFS       fp2=+CONSTANT_AREA(gr3,0)
                           0: DIRCTIV   issue_cycle,3
                           4: LFS       fp4=+CONSTANT_AREA(gr3,4)
                           0: DIRCTIV   issue_cycle,4
                           4: LFS       fp3=+CONSTANT_AREA(gr3,8)
                           0: DIRCTIV   issue_cycle,5
                           4: MFL       fp5=fp0,fp0,fcr
                           4: LFS       fp6=+CONSTANT_AREA(gr3,12)
                           0: DIRCTIV   issue_cycle,6
                           4: LFS       fp7=+CONSTANT_AREA(gr3,16)
                           0: DIRCTIV   issue_cycle,10
                           4: FMA       fp1=fp2,fp1,fp5,fcr
                           0: DIRCTIV   issue_cycle,15
                           4: FMA       fp2=fp3,fp1,fp4,fcr
                           0: DIRCTIV   issue_cycle,20
                           4: FMA       fp2=fp6,fp1,fp2,fcr
                           0: DIRCTIV   issue_cycle,25
                           4: FMA       fp2=fp7,fp1,fp2,fcr
                           0: DIRCTIV   issue_cycle,30
                           4: MFL       fp1=fp1,fp2,fcr
                           0: DIRCTIV   issue_cycle,35
                           4: FMA       fp1=fp0,fp0,fp1,fcr
                           0: DIRCTIV   issue_cycle,36
                           5: CONSUME   gr1,gr2,lr,gr14-gr31,fp1,fp14-fp31,fp46-fp63,
                                        cr[234],fsr,fcr,ctr
                           5: BA        lr
                           4: BB_END
                           5: BB_BEGIN  3 / 0
                           5: PEND
                           5: BB_END
** End of Procedure List for Proc # 2: reciprocal_square_root End of Phase 3 **
GPR's set/used:    ssuu ssss ss-- s--- ---- ---- ---- ----
FPR's set/used:    ssss ssss ssss ss-- ---- ---- ---- ssss
                   ssss ssss ssss ss-- ---- ---- ---- ssss
CCR's set/used:    ---- ----
   | 000000                              PDEF        ten_reciprocal_square_root
   0 |                                   PROC        f,x,gr3,gr4
   0 | 000000   ori     602C0000   1     LR          gr12=gr1
   0 | 000004   addi    3800FFF0   1     LI          gr0=-16
   0 | 000008   stwu    9421FFB0   1     ST4U        gr1,#stack(gr1,-80)=gr1
   0 | 00000C   stfpdux 7FEC07DC   1     SFPLU       gr12,#stack(gr12,gr0,0)=fp31,fp63
   0 | 000010   stfpdux 7FCC07DC   1     SFPLU       gr12,#stack(gr12,gr0,0)=fp30,fp62
   0 | 000014   stfpdux 7FAC07DC   1     SFPLU       gr12,#stack(gr12,gr0,0)=fp29,fp61
   0 | 000018   stfpdux 7F8C07DC   1     SFPLU       gr12,#stack(gr12,gr0,0)=fp28,fp60
  18 | 00001C   addi    38C00048   1     LI          gr6=72
  17 | 000020   lfd     C9A40040   1     LFL         fp13=(*)Cdouble(gr4,64)
  16 | 000024   addi    38E00038   1     LI          gr7=56
  18 | 000028   lfsdx   7DA4319C   1     LFL         fp45=(*)Cdouble(gr4,gr6,0,trap=72)
  14 | 00002C   addi    38A00028   1     LI          gr5=40
  15 | 000030   lfd     C8640030   1     LFL         fp3=(*)Cdouble(gr4,48)
  16 | 000034   lfsdx   7C64399C   1     LFL         fp35=(*)Cdouble(gr4,gr7,0,trap=56)
  12 | 000038   addi    38C00018   1     LI          gr6=24
  19 | 00003C   addis   3D000000   1     LA          gr8=.+CONSTANT_AREA%HI (gr2,0)
  13 | 000040   lfd     C8240020   1     LFL         fp1=(*)Cdouble(gr4,32)
```

APPENDIX-continued

| 14 | 000044 | lfsdx | 7C24299C | 1 | LFL | fp33=(*)Cdouble(gr4,gr5,0,trap=40) |
| 27 | 000048 | fprsqrte | 0180681E | 1 | FPRSQRE | fp12,fp44=fp13,fp45 |
| 11 | 00004C | lfd | CBE40010 | 1 | LFL | fp31=(*)Cdouble(gr4,16) |
| 10 | 000050 | addi | 38E00008 | 1 | LI | gr7=8 |
| 25 | 000054 | fprsqrte | 0160181E | 1 | FPRSQRE | fp11,fp43=fp3,fp35 |
| 12 | 000058 | lfsdx | 7FE4319C | 1 | LFL | fp63=(*)Cdouble(gr4,gr6,0,trap=24) |
| 19 | 00005C | addi | 39280000 | 1 | LA | gr9=+CONSTANT_AREA%LO(gr8,0) |
| 9 | 000060 | lfd | C9440000 | 1 | LFL | fp10=(*)Cdouble(gr4,0) |
| 23 | 000064 | fprsqrte | 0120081E | 1 | FPRSQRE | fp9,fp41=fp1,fp33 |
| 10 | 000068 | lfsdx | 7D44399C | 1 | LFL | fp42=(*)Cdouble(gr4,gr7,0,trap=8) |
| 27 | 00006C | fpmul | 008C0310 | 1 | FPMUL | fp4,fp36=fp12,fp44,fp12,fp44,fcr |
| 19 | 000070 | lfpsx | 7D09331C | 1 | LFPS | fp8,fp40=+CONSTANT_AREA(gr9,gr6,0,trap=24) |
| 19 | 000074 | addi | 39000020 | 1 | LI | gr8=32 |
| 21 | 000078 | fprsqrte | 00E0F81E | 1 | FPRSQRE | fp7,fp39=fp31,fp63 |
| 25 | 00007C | fpmul | 004B02D0 | 1 | FPMUL | fp2,fp34=fp11,fp43,fp11,fp43,fcr |
| 19 | 000080 | lfs | C3C90004 | 1 | LFS | fp30=+CONSTANT_AREA(gr9,4) |
| 19 | 000084 | fprsqrte | 00C0501E | 1 | FPRSQRE | fp6,fp38=fp10,fp42 |
| 19 | 000088 | lfpsx | 7FA9431C | 1 | LFPS | fp29,fp61=+CONSTANT_AREA(gr9,gr8,0,trap=32) |
| 23 | 00008C | fpmul | 00090250 | 1 | FPMUL | fp0,fp32=fp9,fp41,fp9,fp41,fcr |
| 19 | 000090 | lfpsx | 7F892B1C | 1 | LFPS | fp28,fp60=+CONSTANT_AREA(gr9,gr5,0,trap=40) |
| 19 | 000094 | addi | 38800030 | 1 | LI | gr4=48 |
| 27 | 000098 | fpmadd | 008D4120 | 1 | FPMADD | fp4,fp36=fp8,fp40,fp13,fp45,fp4,fp36,fcr |
| 19 | 00009C | lfpsx | 7CA9231C | 1 | LFPS | fp5,fp37=+CONSTANT_AREA(gr9,gr4,0,trap=48) |
| 21 | 0000A0 | fpmul | 01A701D0 | 1 | FPMUL | fp13,fp45=fp7,fp39,fp7,fp39,fcr |
| 25 | 0000A4 | fpmadd | 006340A0 | 1 | FPMADD | fp3,fp35=fp8,fp40,fp3,fp35,fp2,fp34,fcr |
| 38 | 0000A8 | addi | 38C00048 | 1 | LI | gr6=72 |
| 19 | 0000AC | fpmul | 00460190 | 1 | FPMUL | fp2,fp34=fp6,fp38,fp6,fp38,fcr |
| 39 | 0000B0 | addi | 38000010 | 1 | LI | gr0=16 |
| 23 | 0000B4 | fpmadd | 00214020 | 1 | FPMADD | fp1,fp33=fp8,fp40,fp1,fp0,fp32,fcr |
| 39 | 0000B8 | ori | 602C0000 | 1 | LR | gr12=gr1 |
| 27 | 0000BC | fxcpmadd | 001EE924 | 1 | FXPMADD | fp0,fp32=fp29,fp61,fp4,fp36,fp30,fp30,fcr |
| 36 | 0000C0 | addi | 38E00038 | 1 | LI | gr7=56 |
| 21 | 0000C4 | fpmadd | 03FF4360 | 1 | FPMADD | fp31,fp63=fp8,fp40,fp31,fp63,fp13,fp45,fcr |
| 25 | 0000C8 | fxcpmadd | 01BEE8E4 | 1 | FXPMADD | fp13,fp45=fp29,fp61,fp3,fp35,fp30,fp30,fcr |
| 19 | 0000CC | fpmadd | 010A40A0 | 1 | FPMADD | fp8,fp40=fp8,fp40,fp10,fp42,fp2,fp34,fcr |
| 23 | 0000D0 | fxcpmadd | 005EE864 | 1 | FXPMADD | fp2,fp34=fp29,fp61,fp1,fp33,fp30,fp30,fcr |
| 27 | 0000D4 | fpmadd | 0144E020 | 1 | FPMADD | fp10,fp42=fp28,fp60,fp4,fp36,fp0,fp32,fcr |
| 21 | 0000D8 | fxcpmadd | 001EEFE4 | 1 | FXPMADD | fp0,fp32=fp29,fp61,fp31,fp63,fp30,fp30,fcr |
| 25 | 0000DC | fpmadd | 01A3E360 | 1 | FPMADD | fp13,fp45=fp28,fp60,fp3,fp35,fp13,fp45,fcr |
| 19 | 0000E0 | fxcpmadd | 03DEEA24 | 1 | FXPMADD | fp30,fp62=fp29,fp61,fp8,fp40,fp30,fp30,fcr |
| 23 | 0000E4 | fpmadd | 0041E0A0 | 1 | FPMADD | fp2,fp34=fp28,fp60,fp1,fp33,fp2,fp34,fcr |
| 27 | 0000E8 | fpmadd | 01442AA0 | 1 | FPMADD | fp10,fp42=fp5,fp37,fp4,fp36,fp10,fp42,fcr |
| 21 | 0000EC | fpmadd | 001FE020 | 1 | FPMADD | fp0,fp32=fp28,fp60,fp31,fp63,fp0,fp32,fcr |
| 25 | 0000F0 | fpmadd | 01A32B60 | 1 | FPMADD | fp13,fp45=fp5,fp37,fp3,fp35,fp13,fp45,fcr |
| 19 | 0000F4 | fpmadd | 03C8E7A0 | 1 | FPMADD | fp30,fp62=fp28,fp60,fp8,fp40,fp30,fp62,fcr |
| 23 | 0000F8 | fpmadd | 004128A0 | 1 | FPMADD | fp2,fp34=fp5,fp37,fp1,fp33,fp2,fp34,fcr |
| 27 | 0000FC | fpmul | 00840290 | 1 | FPMUL | fp4,fp36=fp4,fp36,fp10,fp42,fcr |
| 39 | 000100 | lfpdux | 7F8C03DC | 1 | LFPLU | fp28,fp60,gr12=#stack(gr12,gr0,0) |
| 21 | 000104 | fpmadd | 001F2820 | 1 | FPMADD | fp0,fp32=fp5,fp37,fp31,fp63,fp0,fp32,fcr |
| 39 | 000108 | lfpdux | 7FAC03DC | 1 | LFPLU | fp29,fp61,gr12=#stack(gr12,gr0,0) |
| 25 | 00010C | fpmul | 00630350 | 1 | FPMUL | fp3,fp35=fp3,fp35,fp13,fp45,fcr |
| 19 | 000110 | fpmadd | 00A82FA0 | 1 | FPMADD | fp5,fp37=fp5,fp37,fp8,fp40,fp30,fp62,fcr |
| 23 | 000114 | fpmul | 00210090 | 1 | FPMUL | fp1,fp33=fp1,fp33,fp2,fp34,fcr |
| 27 | 000118 | fpmadd | 004C6120 | 1 | FPMADD | fp2,fp34=fp12,fp44,fp12,fp44,fp4,fp36,fcr |
| 39 | 00011C | lfpdux | 7FCC03DC | 1 | LFPLU | fp30,fp62,gr12=#stack(gr12,gr0,0) |
| 21 | 000120 | fpmul | 001F0010 | 1 | FPMUL | fp0,fp32=fp31,fp63,fp0,fp32,fcr |
| 25 | 000124 | fpmadd | 006B58E0 | 1 | FPMADD | fp3,fp35=fp11,fp43,fp11,fp43,fp3,fp35,fcr |
| 19 | 000128 | fpmul | 00880150 | 1 | FPMUL | fp4,fp36=fp8,fp40,fp5,fp37,fcr |
| 39 | 00012C | lfpdux | 7FEC03DC | 1 | LFPLU | fp31,fp63,gr12=#stack(gr12,gr0,0) |
| 23 | 000130 | fpmadd | 00294860 | 1 | FPMADD | fp1,fp33=fp9,fp41,fp9,fp41,fp1,fp33,fcr |
| 39 | 000134 | addi | 38210050 | 1 | AI | gr1=gr1,80,gr12 |
| 38 | 000138 | stfsdx | 7C43359C | 1 | STFL | (*)double(gr3,gr6,0,trap=72)=fp34 |
| 32 | 00013C | addi | 38C00018 | 1 | LI | gr6=24 |
| 21 | 000140 | fpmadd | 00073820 | 1 | FPMADD | fp0,fp32=fp7,fp39,fp7,fp39,fp0,fp32,fcr |
| 37 | 000144 | stfd | D8430040 | 1 | STFL | (*)double(gr3,64)=fp2 |
| 36 | 000148 | stfsdx | 7C633D9C | 1 | STFL | (*)double(gr3,gr7,0,trap=56)=fp35 |
| 30 | 00014C | addi | 38E00008 | 1 | LI | gr7=8 |
| 35 | 000150 | stfd | D8630030 | 1 | STFL | (*)double(gr3,48)=fp3 |
| 19 | 000154 | fpmadd | 00463120 | 1 | FPMADD | fp2,fp34=fp6,fp38,fp6,fp38,fp4,fp36,fcr |
| 34 | 000158 | stfsdx | 7C232D9C | 1 | STFL | (*)double (gr3,gr5,0,trap=40)=fp33 |
| 33 | 00015C | stfd | D8230020 | 1 | STFL | (*)double(gr3,32)=fp1 |
| 32 | 000160 | stfsdx | 7C03359C | 1 | STFL | (*)double(gr3,gr6,0,trap=24)=fp32 |
| 31 | 000164 | stfd | D8030010 | 1 | STFL | (*)double(gr3,16)=fp0 |
| 30 | 000168 | stfsdx | 7C433D9C | 1 | STFL | (*)double(gr3,gr7,0,trap=8)=fp34 |
| 29 | 00016C | stfd | D8430000 | 1 | STFL | (*)double(gr3,0)=fp2 |
| 39 | 000170 | bclr | 4E800020 | 0 | BA | lr |
| | Instruction count | | | | | 93 |

GPR's set/used:  --us ---- ---- ---- ---- ---- ---- ----
FPR's set/used:  ssss ssss ---- ---- ---- ---- ---- ----

APPENDIX-continued

```
CCR's set/used:    ---- ----
                   ---- ----
     | 000000                              PDEF    reciprocal_square_root
  0  |                                     PROC    x,fp1
  4  | 000174   frsqrte   FC000834    1    FRSQRE  fp0=fp1
  4  | 000178   addis     3C600000    1    LA      gr3=.+CONSTANT_AREA%HI(gr2,0)
  4  | 00017C   addi      38630000    1    LA      gr3=+CONSTANT_AREA%LO(gr3,0)
  4  | 000180   lfs       C0430000    1    LFS     fp2=+CONSTANT_AREA(gr3,0)
  4  | 000184   lfs       C0830004    1    LFS     fp4=+CONSTANT_AREA(gr3,4)
  4  | 000188   lfs       C0630008    1    LFS     fp3=+CONSTANT_AREA(gr3,8)
  4  | 00018C   fmul      FCA00032    1    MFL     fp5=fp0,fp0,fcr
  4  | 000190   lfs       C0C3000C    1    LFS     fp6=+CONSTANT_AREA(gr3,12)
  4  | 000194   lfs       C0E30010    1    LFS     fp7=+CONSTANT_AREA(gr3,16)
  4  | 000198   fmadd     FC21117A    2    FMA     fp1=fp2,fp1,fp5,fcr
  4  | 00019C   fmadd     FC41193A    4    FMA     fp2=fp3,fp1,fp4,fcr
  4  | 0001A0   fmadd     FC4130BA    4    FMA     fp2=fp6,fp1,fp2,fcr
  4  | 0001A4   fmadd     FC4138BA    4    FMA     fp2=fp7,fp1,fp2,fcr
  4  | 0001A8   fmul      FC2100B2    4    MFL     fp1=fp1,fp2,fcr
  4  | 0001AC   fmadd     FC20007A    4    FMA     fp1=fp0,fp0,fp1,fcr
  5  | 0001B0   bclr      4E800020    0    BA      lr
     |                    Instruction count             16
     |                    Constant Area
     |                    000000 BF800000 3E8C0000 BEA00000 3EC00000 BF000000 49424D20
     |                    000018 BFB00000 BF800000 BEA00000 BEA00000 3EC00000 3EC00000
     |                    000030 BF000000 BF000000
```

What is claimed is:

1. A system for calculating the reciprocal square root of a number, comprising:
 a processor;
 a memory storing code accessible by the processor to form a piecewise-linear estimate for the reciprocal square root of a number;
 round said estimate to a lower precision;
 compute the residual of said rounded estimate;
 use a Taylor Expansion to compute the polynomial in said residual of said estimate to obtain the residual error; and
 multiply said rounded estimate by said residual error and adding the result to said rounded estimate, and
 whereby said system is capable of calculating a reciprocal square root of a number.

2. The system of claim 1, wherein said estimate is rounded to one half the number of digits sought for the final result.

3. The system of claim 1, wherein the said estimate is rounded to less than one half the number of digits sought for the final result.

* * * * *